United States Patent
Zhu et al.

(10) Patent No.: US 11,850,968 B2
(45) Date of Patent: Dec. 26, 2023

(54) ELECTRIFIED VEHICLE CONTROL BASED ON VALIDATED BATTERY CELL VOLTAGES COMPRESSED AND ENCRYPTED USING ARTIFICIAL INTELLIGENCE

(71) Applicant: FORD GLOBAL TECHNOLOGIES, LLC, Dearborn, MI (US)

(72) Inventors: Di Zhu, Canton, MI (US); Jeffrey Joseph Campbell, Fort Worth, TX (US); Gyouho Cho, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 310 days.

(21) Appl. No.: 17/210,114

(22) Filed: Mar. 23, 2021

(65) Prior Publication Data

US 2022/0305950 A1 Sep. 29, 2022

(51) Int. Cl.
*B60L 58/12* (2019.01)
*B60L 53/60* (2019.01)
(Continued)

(52) U.S. Cl.
CPC ............... *B60L 58/12* (2019.02); *B60L 53/60* (2019.02); *B60L 58/10* (2019.02); *G06N 3/02* (2013.01);
(Continued)

(58) Field of Classification Search
CPC .......... B60L 58/12; B60L 53/60; B60L 58/10; B60L 2210/10; B60L 2240/547;
(Continued)

(56) References Cited

U.S. PATENT DOCUMENTS 9,078,125 B2  7/2015  Lavi et al.
9,425,963 B2  8/2016  Nairn et al.
(Continued)

OTHER PUBLICATIONS

English Translation of JP2019047696A Author: Iwae et al. Title: Power System Monitoring System, Power System Monitoring Method, and Program Date: Mar. 22, 2019 (Year: 2019).*
(Continued)

*Primary Examiner* — James J Lee
*Assistant Examiner* — Steven Vu Nguyen
(74) *Attorney, Agent, or Firm* — Brooks Kushman PC; David B Kelley

(57) ABSTRACT

A vehicle includes a traction battery and a cell monitor associated with battery cell strings each having associated connected battery cells. Each monitor is configured to generate a compressed encoded representation of the traction battery cell voltage measurements using artificial intelligence, such as a neural network. A battery controller in communication with each cell monitor receives the compressed encoded representation and generates reconstructed battery cell voltage measurements and controls the traction battery in response to the reconstructed traction battery cell voltage measurements. An unencoded battery cell voltage measurement may be communicated with the compressed encoded representation of the battery cell voltage measurements and used to validate the reconstructed measurements.

9 Claims, 6 Drawing Sheets

(51) Int. Cl.
  *G07C 5/08* (2006.01)
  *B60L 58/10* (2019.01)
  *G06N 3/02* (2006.01)
  *G06N 3/06* (2006.01)
  *B60K 6/28* (2007.10)

(52) U.S. Cl.
  CPC ............... *G06N 3/06* (2013.01); *G07C 5/085* (2013.01); *B60K 6/28* (2013.01); *B60L 2210/10* (2013.01); *B60L 2240/547* (2013.01); *B60Y 2200/91* (2013.01); *B60Y 2200/92* (2013.01); *B60Y 2300/91* (2013.01)

(58) Field of Classification Search
  CPC . G06N 3/02; G06N 3/06; G07C 5/085; B60K 6/28; B60Y 2200/91; B60Y 2200/92; B60Y 2300/91
  See application file for complete search history.

(56) References Cited

U.S. PATENT DOCUMENTS

| | | |
|---|---|---|
| 10,390,221 B2 | 8/2019 | Lawlis et al. |
| 10,776,659 B2 | 9/2020 | Beral et al. |
| 2013/0273847 A1 | 10/2013 | Le et al. |
| 2018/0123357 A1* | 5/2018 | Beaston .................. H02J 3/381 |
| 2020/0145661 A1* | 5/2020 | Jeon ...................... H04N 19/136 |
| 2020/0223322 A1* | 7/2020 | Seeman ................ B60L 3/0046 |
| 2021/0042618 A1* | 2/2021 | Choung ................. G06N 3/088 |
| 2021/0050736 A1* | 2/2021 | Bordes ................... H03M 5/10 |

OTHER PUBLICATIONS

English Translation of CN109742829A Author: Wang et al. Title: Battery Management System Based On Internet Of Things Date: May 10, 2019 (Year: 2019).*

* cited by examiner

ELECTRIFIED VEHICLE CONTROL BASED ON VALIDATED BATTERY CELL VOLTAGES COMPRESSED AND ENCRYPTED USING ARTIFICIAL INTELLIGENCE

TECHNICAL FIELD

This disclosure relates to vehicle control using vehicle data communicated to a controller after being processed using artificial intelligence to compress, encrypt, and verify the vehicle data.

BACKGROUND

Electrification has been and will continue to be the trend for the next couple of decades for the automotive industry. As more and more vehicles are electrified, high voltage (HV) battery packs are increasing in capacity and number of battery cells to provide expected travel range and vehicle performance. An HV battery pack usually includes a controller, such as a battery electrical control module (BECM), several cell monitor and management (CMM) modules, a battery electrical circuit, a current sensor, and a pack voltage sensor to monitor and control operation of individual battery cells that are connected together to provide the HV battery pack output voltage and current to power the vehicle. Each CMM monitors and controls a string of associated battery cells. Various battery cell parameters including cell voltage are measured and reported by the CMM to the BECM. The BECM uses cell voltages and other cell parameters in addition to overall battery pack parameters to control the battery electrical circuit, and may also communicate battery cell and/or battery pack information to other vehicle controllers, such as a battery charger module, a body control module, and/or a powertrain control module, for example.

As HV battery packs become larger, the increasing number of cells and strings of cells increases the quantity of measurement data, such as cell voltages, to be communicated to various vehicle controllers to monitor and control the battery pack and other vehicle systems. Storing and transmitting cell data will therefore increasingly consume a significant amount of controller and communication network resources. In addition, when data is transmitted among controllers in the vehicle or from a vehicle to a data center, the data becomes a target of snooping and hacking. Validity of data that has been communicated between controllers, between vehicles, or from a data center and subject to communication errors or intentional hacking is needed prior to utilization of the data in vehicle control.

SUMMARY

Embodiments of the disclosure include a vehicle comprising a traction battery, a cell monitor associated with each of a plurality of battery cell strings of the traction battery, each battery cell string having an associated plurality of connected battery cells, each cell monitor including a processor and memory and configured to receive battery cell voltage measurements and to generate, using a neural network, a compressed encoded representation of the traction battery cell voltage measurements, and a battery controller having a processor and memory and in communication with each cell monitor, the battery controller configured to receive the compressed encoded representation of the battery cell voltage measurements, to generate, using a second instance of the neural network, reconstructed traction battery cell voltage measurements, and to control the traction battery in response to the reconstructed traction battery cell voltage measurements. The neural network may comprise a symmetric neural network or autoencoder having an odd number of hidden layers between an input layer and an output layer. The neural network may include a hidden bottleneck layer having a single neuron that contains the compressed encoded representation of the battery cell voltage measurements. In one embodiment, the neural network comprises three hidden layers including a first hidden layer of twenty neurons coupled to the bottleneck layer, which is coupled to a second hidden layer of twenty neurons.

In various embodiments, at least one cell monitor may be configured to communicate an unencoded battery cell voltage measurement with the compressed encoded representation of the battery cell voltage measurements. The battery controller may be further configured to compare the unencoded battery cell voltage measurement with a corresponding one of the reconstructed battery cell voltage measurements. The battery controller may be further configured to generate a diagnostic code in response to a difference between the unencoded battery cell voltage measurement value and the corresponding one of the reconstructed battery voltage measurement values exceeding an associated threshold. The battery controller may be configured to communicate the reconstructed battery cell voltage measurements to at least one vehicle controller.

In one or more embodiments, a vehicle may also include an electric machine powered by the traction battery and configured to provide propulsive power to the vehicle, and a powertrain controller having a processor and memory and in communication with the battery controller and the electric machine, the powertrain controller configured to receive the compressed encoded representation of the battery cell voltage measurements from the battery controller, to generate, using a third instance of the neural network, the reconstructed battery cell voltage measurements, and to control the electric machine based on the reconstructed battery cell voltage measurements. The vehicle may also include a charging controller having a processor and memory, the charging controller in communication with the battery controller and configured to receive the compressed encoded representation of the battery cell voltage measurements, receive an unencoded battery cell voltage measurement associated with the compressed encoded representation of the battery cell voltage measurements, generate, using a fourth instance of the neural network, reconstructed battery cell voltage measurements, control charging of the traction battery when a difference between the unencoded battery cell voltage measurement and a corresponding battery cell voltage measurement from the reconstructed battery cell voltage measurements is not greater than an associated threshold, and generate a diagnostic code when the difference exceeds the associated threshold.

Embodiments may also include a vehicle comprising a first controller having a processor and a memory and a sensor coupled to the first controller and configured to measure a vehicle parameter used by the first controller to control the vehicle, wherein the memory comprises instructions that, when executed, cause the processor to compress vehicle parameter measurements from the sensor using a symmetric neural network having an odd number of hidden layers to generate an encoded representation of the vehicle parameter measurements, and to control the vehicle using the encoded representation of the vehicle parameter measurements. The vehicle may include a second controller having a second processor and a second memory and in communication with the first controller via a vehicle network. The second controller may be configured to, responsive to receiving the encoded representation of the vehicle parameter measurements, execute instructions stored in the second memory representing a second instance of the symmetric neural network to reconstruct the vehicle parameter measurements based on the encoded representation and control the vehicle in response to the reconstructed vehicle parameter measurements. The vehicle may include a traction battery having a plurality of cells, wherein the vehicle parameter comprises a battery cell voltage. The first controller may communicate an unencoded vehicle parameter measurement associated with the encoded representation to the second controller. The second controller may generate a diagnostic code when a difference between the unencoded vehicle parameter measurement and a corresponding reconstructed vehicle parameter measurement exceeds a threshold. The first controller may communicate the encoded representation of the vehicle parameter measurements to an external server.

Various embodiments include a method for a vehicle comprising, by a first vehicle processor, compressing vehicle sensor measurements via a first instance of a neural network including a bottleneck layer that provides an encoded representation of the vehicle sensor measurements, communicating the encoded representation of the vehicle sensor measurements to a second processor, and, by the second processor, reconstructing the vehicle sensor measurements from the encoded representation via a second instance of the neural network. The method may further include controlling the vehicle using the reconstructed vehicle sensor measurements. The vehicle may include a traction battery having a plurality of cells, wherein the vehicle sensor measurements comprise voltage measurements of the plurality of cells. The method may also include communicating an unencoded sensor measurement associated with the encoded representation to the second processor, which compares the unencoded sensor measurement with a corresponding one of the reconstructed vehicle sensor measurements and generates a diagnostic code when the comparing indicates an anomaly between the unencoded vehicle sensor measurement and the reconstructed vehicle sensor measurement.

Embodiments of the disclosure may provide one or more associated advantages. For example, use of a neural network to encrypt, compress, decode and decompress data may be used to substantially reduce a dataset for communication. In one example, a dataset of battery cell voltages was reduced by a factor of ten. This 10-to-1 compression rate can be further increased for datasets having more signals. The maximum root-mean-square error (RMSE) among three RMSEs was 0.01V. Various embodiments according to the disclosure compress cell voltages to save controller and communication resources, encrypt cell voltages to prevent unauthorized usage, provide data decompression and decoding for authorized usage, and have the ability to verify the validity of the communicated values of cell voltage signals utilizing an advanced artificial intelligent (AI) device or strategy. The AI strategy according to one or more embodiments achieves encoding, decoding, compression, and decompression of data within a single apparatus. Validity of the data may also be provided. In one embodiment, detection of a 0.07V anomaly in battery cell voltage under load was detected as compared to an existing product with a sensitivity limited to 0.7V.

As those of ordinary skill in the art will appreciate, the claimed subject matter enables exchange of vehicle data in a more efficient and secure manner, enhances the data validity check before using the data for vehicle and other operations, and protects data users (whether human or controllers) from being sniffed, spoofed, or hacked.

DETAILED DESCRIPTION

Figure 1:
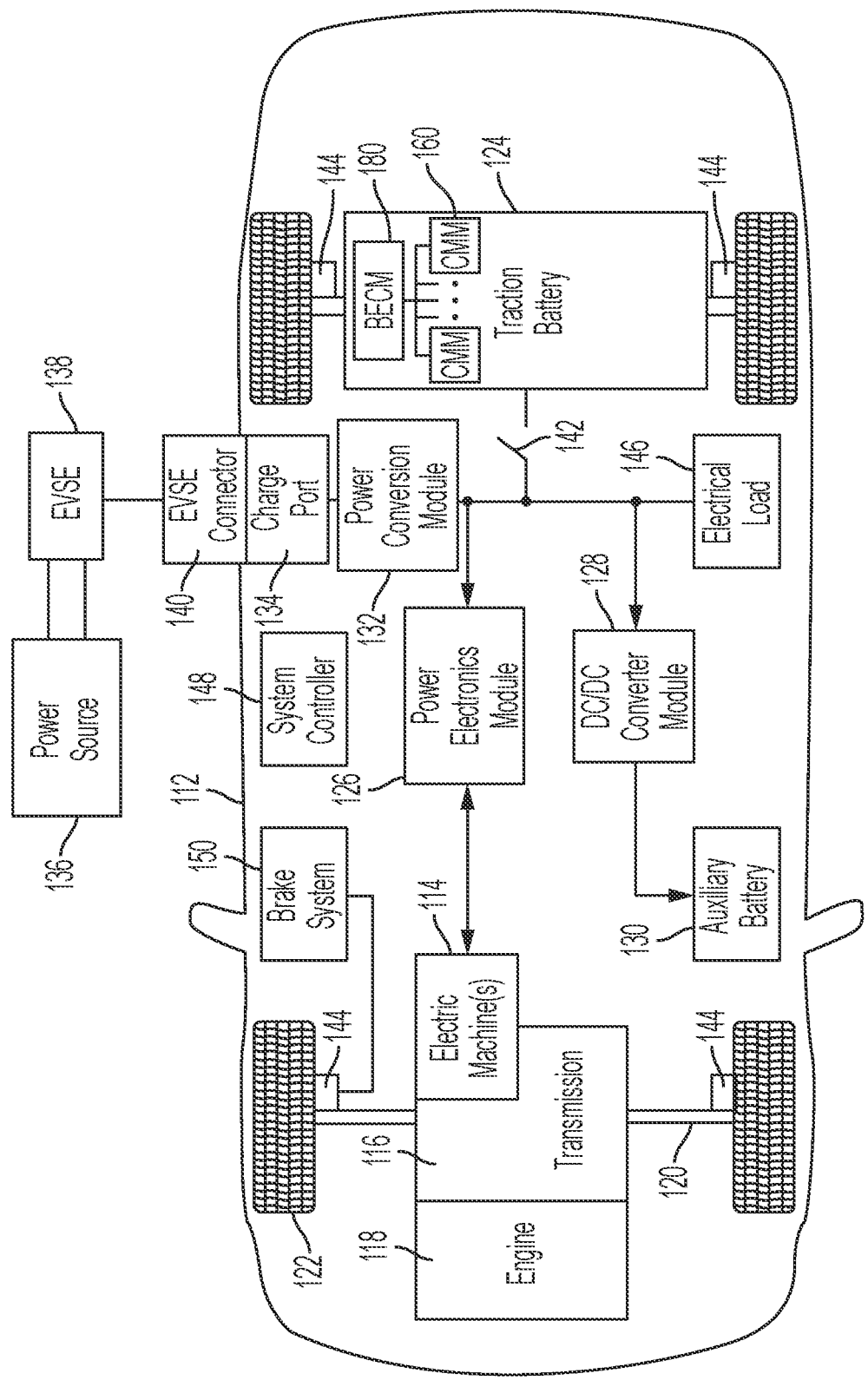
FIG. 1 is a diagram illustrating an example of an electrified vehicle implemented as a plug-in hybrid electric vehicle having vehicle control based on validated vehicle data compressed and encrypted using artificial intelligence.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present inventors have recognized that, unlike some vehicle sensor signals, battery cell voltage signals have similar values most of the time so that efficiency may be increased by merging this data into a single signal for transmission and storage. Whenever the cell voltages are needed for a control or storage feature or function, the cell voltages can be restored from the compressed signal. Use of an artificial intelligence strategy, such as a regression artificial neural network or autoencoder, to generate the encoded/encrypted and compressed representation of the vehicle sensor measurements not only provides for efficient communication and/or storage, but prevents unauthorized interception, modification, or other use of communicated data. Furthermore, unlike communication and storage of an average value, min/max values, or other characterization of underlying sensor measurements to conserve resources, the cell voltage data may be decompressed and decoded by authorized users or controllers without losing key information of individual data values to provide data validation.

Existing products neither compress cell voltages to save controller and communication resources nor encrypt cell voltages to prevent unauthorized usage. To conserve storage and communication bandwidth, some existing products transmit and store only maximum and minimum cell voltages. However, identification of the particular cells having the maximum and minimum voltages is ignored making diagnostics more difficult. In applications or situations where existing products transmit and store all the cell voltages, either the sampling rate/cycle time is sacrificed or resources are used inefficiently. Furthermore, many existing products have limited capability to verify the validity of the values in cell voltage signals which may result in invalid values used in the vehicle operation, data analysis, and/or business decisions. Simply looking at a voltage deviation from average cell voltage may be insufficient to meet desired product performance.

As illustrated in the figures and described in detail below, embodiments according to the disclosure utilize advanced artificial intelligence (AI) techniques to provide encoding, decoding, compression, and decompression of data within one single apparatus. In at least one embodiment, a symmetric regression artificial neural network or autoencoder is used to encrypt, compress, decode, and decompress battery cell voltage data. Empirical testing has demonstrated downsizing of a dataset to ¹/₁₀ of its original size. The 10-to-1 compression ratio can be further increased if the dataset has more signals. The maximum root-mean-square error (RMSE) among ten RMSEs was 0.01V. This example was capable of detecting a voltage anomaly as small as 0.07V under load. While the representative embodiments are described with respect to battery cell voltages or similar vehicle sensor measurements, those of ordinary skill in the art will recognize that a similar strategy may be applied to various other types of vehicle data to provide similar advantages with respect to data security, data validation, and conservation of resources, such as communication bandwidth, processor efficiency, and storage space, for example. While various embodiments are described with respect to a neural network or more particularly an autoencoder, other artificial intelligence or machine learning strategies may be used to provide similar features and results depending on the particular application and implementation. Likewise, while RMSE was selected as a measure of reconstruction loss in training the autoencoder, the particular measure selected may vary depending on the particular characteristics of the vehicle measurements being encoded and/or desired fidelity of the reconstructed data.

FIG. 1 depicts a representative embodiment of an artificial intelligence strategy used to compress and encode vehicle data for communication or storage. In the representative vehicle embodiment of FIG. 1, vehicle 112 is an electrified vehicle, such as a plug-in hybrid electric vehicle (HEV) in this example, but may also be a fully electrified battery electric vehicle (BEV) or other type of vehicle depending on the particular implementation. Vehicle 112 may comprise one or more electric machines 114 mechanically connected to a transmission 116. The electric machines 114 may be capable of operating as a motor or a generator. In addition, the transmission 116 is mechanically connected to an internal combustion engine 118. The transmission 116 is also mechanically connected to a drive shaft 20 that is mechanically connected to the wheels 122. The electric machines 114 can provide propulsion and regenerative braking capability when the engine 118 is turned on or off. During regenerative braking, the electric machines 114 act as generators and can provide fuel economy benefits by recovering energy that would normally be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that can be used by the electric machines 114 in a plurality of low voltage cells connected in groups or strings to provide a desired energy storage capacity and output voltage/current. A vehicle battery pack 124 typically provides a high voltage DC output. Each group or string of cells may have an associated cell monitoring module (CMM) 160 that measures voltages for individual battery cells or groups of cells and controls various battery functions, such as cell balancing, for example. Each CMM 160 may communicate with a battery controller, sometimes referred to as a battery energy control module (BECM) 180. The BECM may communicate with one or more other vehicle controllers over a wired or wireless vehicle network to provide higher-level control functions of the traction battery 124 as described herein. Each CMM may include an instance of a trained neural network that generates an encoded representation of sensor measurements, such as battery cell voltages, and communicates the encoded representation to the BECM 180, which may in turn communicate the encoded representation to one or more other vehicle controllers, such as system controller 148. The neural network may be implemented in hardware and/or software. One or more CMMs 160 may also communicate an unencoded measurement value associated with the encoded representation to provide data validation. The encoded representation may be used to control the vehicle 112, or may be used to reconstruct the sensor measurements, which may then be used to control the vehicle 112. Operation of a representative neural network with data validation is illustrated and described in greater detail with reference to FIGS. 2-7.

The traction battery 124 is electrically connected to one or more power electronics modules. One or more contactors 142 may isolate the traction battery 124 from other components when opened and connect the traction battery 124 to other components when closed. A power electronics module 126 is also electrically connected to the electric machines 114 and provides the ability to bi-directionally transfer energy between the traction battery 124 and the electric machines 114. For example, a typical traction battery 124 may provide a DC voltage while the electric machines 114 may require a three-phase AC current to function. The power electronics module 126 may convert the DC voltage to a three-phase AC current as required by the electric machines 114. In a regenerative mode, the power electronics module 126 may convert the three-phase AC current from the electric machines 114 acting as generators to the DC voltage required by the traction battery 124. The description herein is equally applicable to an electrified vehicle implemented as a pure electric vehicle, often referred to as a battery electric vehicle (BEV). For a BEV, the hybrid transmission 116 may be a gear box connected to an electric machine 114 and the engine 118 may be omitted.

In addition to providing energy for propulsion, the traction battery 124 may provide energy for other vehicle electrical systems. A typical system may include a DC/DC converter module 128 that converts the high voltage DC output of the traction battery 124 to a low voltage DC supply that is compatible with other vehicle loads. Other high-voltage loads, such as compressors and electric heaters, may be connected directly to the high-voltage without the use of a DC/DC converter module 128. The low-voltage systems may be electrically connected to an auxiliary battery 130 (e.g., 12V, 24V, or 48V battery).

The electrified vehicle 112 may be a BEV or a plug-in hybrid vehicle in which the traction battery 124 may be recharged by an external power source 136, or a standard hybrid that charges traction battery from operating electric machines as a generator but does not receive power from an external power source. The external power source 136 may be a connection to an electrical outlet. The external power source 136 may be electrically connected to electric vehicle supply equipment (EVSE) 138. The EVSE 138 may provide circuitry and controls to regulate and manage the transfer of energy between the power source 136 and the vehicle 112. In other embodiments, the vehicle 112 may employ wireless charging, which may be referred to as hands-free or contactless charging that uses inductive or similar wireless power transfer.

The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically connected to an on-board power conversion module 132 having an associated battery charger controller. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically connected may transfer power using a wireless inductive coupling as previously described.

One or more wheel brakes 144 may be provided for friction braking of the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components that are required to operate the wheel brakes 144. For simplicity, the figure depicts a single connection between the brake system 150 and one of the wheel brakes 144. A connection between the brake system 150 and the other wheel brakes 144 is implied.

One or more electrical loads 146 may be connected to the high-voltage bus. The electrical loads 146 may have an associated controller that operates the electrical load 146 when appropriate. Examples of electrical loads 146 may be a heating module or an air-conditioning module.

The various components described may have one or more associated controllers to control and monitor the operation of the components. The controllers may communicate via a vehicle network that may be implemented as a serial bus (e.g., Controller Area Network (CAN)) or via discrete conductors. In addition, a system controller 148 may be present to coordinate the operation of the various components and may communicate directly or indirectly with one or more other vehicle controllers, such as BECM 180, a body controller or control module, and a battery charger controller or control module.

Figure 2:
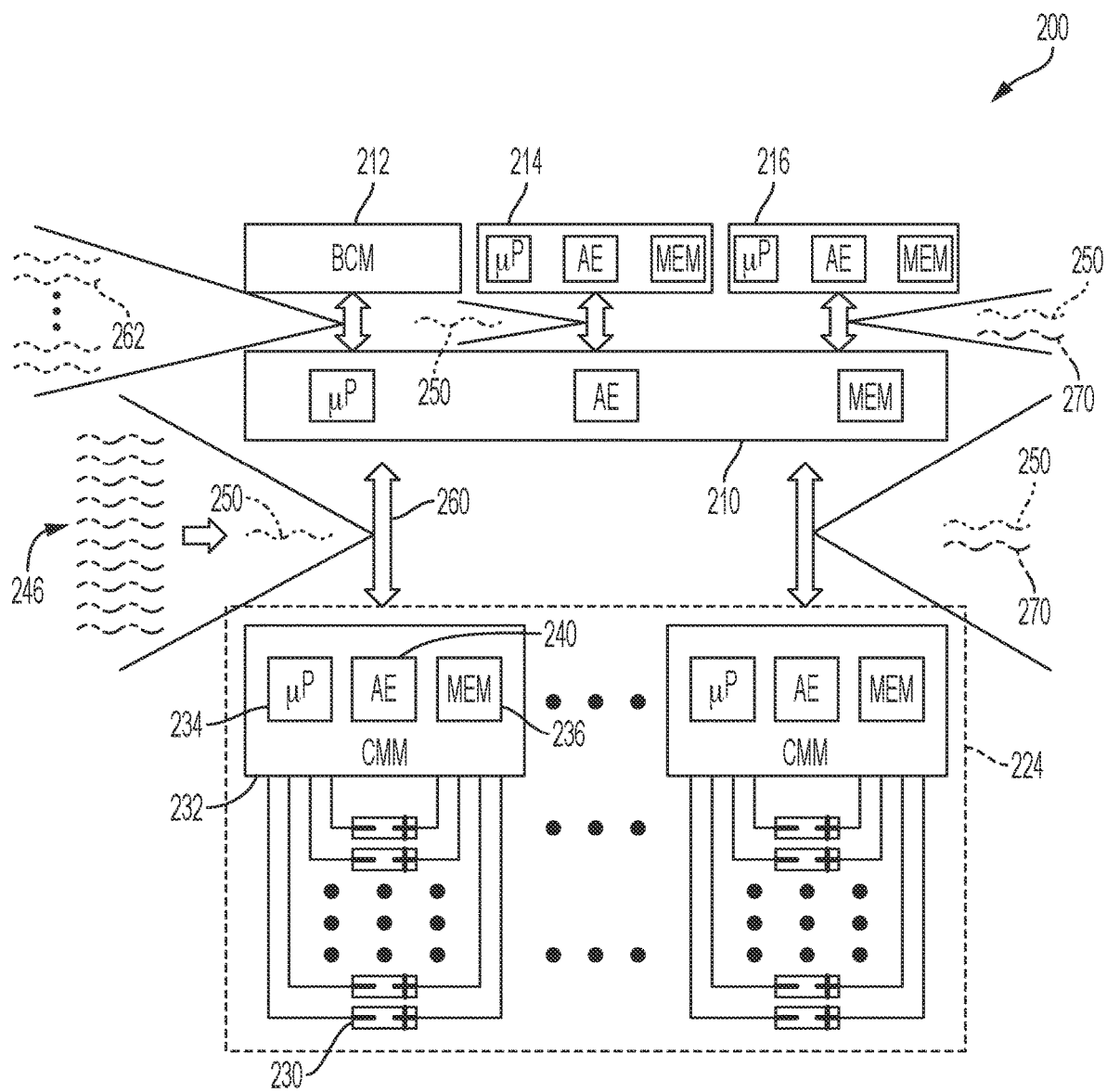
FIG. 2 is a block diagram illustrating communication of vehicle data among control modules and validation of vehicle data after communication using artificial intelligence for data compression/decompression and encryption/decryption.

FIG. 2 provides a more detailed block diagram of one embodiment illustrating operation of an electrified vehicle system or method for compressing and encoding vehicle measurements using artificial intelligence (AI) techniques. System 200 includes various controllers or control modules, such as a BECM 210, a body controller or control module (BCM) 212, a powertrain controller or control module (PCM) 214, and a charger controller or control module 216. that may communicate via a wired or wireless vehicle network to control the vehicle via control of various vehicle components or subsystems, such as traction battery 224. Traction battery 224 includes a plurality of cells 230 arranged in groups or strings of cells connected to an associated controller, such as a cell monitor and management (CMM) 232 controller. Each CMM 232 monitors or measures one or more parameters of associated battery cells 230, such as battery cell voltages, for example. Other monitored or measured parameters for individual cells or groups of cells may include temperature and current. Each CMM 232 may also perform various cell management functions such as cell balancing or current limiting, for example.

Various controllers, such as BECM 210, PCM 214, charger module 216, CMMs 232, etc. may include a processor 234 and associated memory 236. Other controllers or control modules 212 may not include a microprocessor or memory, or may have limited processor and memory resources, such as BCM 212, for example. Each controller may communicate with various vehicle sensors to collect associated measurements and supply signals to operate associated actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the processor.

As previously described, one or more controllers may include an associated neural network or autoencoder (AE) 240. As described in greater detail with reference to FIG. 3, AE 240 may be implemented in or by a controller having a processor and memory configured to receive and process vehicle measurements, such as battery cell voltage measurements and generate a compressed encoded representation of the measurements. The encoded/encrypted representation of the measurements may be used to securely and efficiently communicate the data to another controller of the vehicle or to an external computer server via a wired or wireless communication network. Another instance or instantiation of AE 240 in another controller may then be used to process the encoded representation of the measurements to reconstruct the measurements for use by the receiving controller to control the vehicle. In various embodiments, one or more controllers may include only a portion of an AE 240. For example, devices that only encode signals may include only the encoder portion of an AE 240 having an input layer and hidden layers up to the middle layer where the code is generated. Similarly, devices that only decode signals may include only the decoder portion of an AE 240 having the middle layer that receives the code and the hidden layers to the output layer to generate the reconstructed signals from the code.

It should be understood that any one of the representative controllers can collectively be referred to as a "controller"

that controls various actuators in response to signals from various sensors to control the vehicle Each processor 234 may include a microprocessor or central processing unit (CPU) in communication with various types of memory 236 or non-transitory computer readable storage devices or media. Computer readable storage devices or media may include volatile and nonvolatile or persistent storage in read-only memory (ROM), random-access memory (RAM), and keep-alive memory (KAM), for example. KAM is a persistent or non-volatile memory that may be used to store various operating variables while the processor is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle via various vehicle components or subsystems.

Control logic, functions, code, software, strategy etc. performed by one or more processors or controllers may be represented by block diagrams, flow charts, or similar diagrams in one or more figures. These figures provide representative control strategies, algorithms, and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 150. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

As generally illustrated in FIG. 2, BECM 210 functions as the gateway between CMMs 232 of the traction battery 224 and various other vehicle controllers or modules including BCM 212, PCM 214 and charger controller 216. The BECM 210 controls the CMMs 232 and interacts with the other modules. Each CMM 232 is responsible for controlling and monitoring battery cells 230 in an associated cell string, group, or block. Each CMM 232 has a processor 234, memory 236 and an AE 240 that includes an encoder and decoder. Each AE 240 encrypts and compresses measurements 246 such as battery cell voltages to generate an encoded representation 250 of the measurements prior to communicating the representation 250 over a bidirectional wired or wireless network 260 to BECM 210. The AE 240 (or portion thereof) may also decode and decompress data representation 250 received from BECM 210. As illustrated, cell voltages 246 from multiple cells are compressed into one single signal 250, which is an encoded representation of cell voltages 246 and may be referred to as code, latent variables, or latent representation. The code 250 is received, decoded, and decompressed by the BECM 210 to reconstruct the original measurements. The BECM 210 may send reconstructed cell voltages 262 to a controller or module which does not have an encoder and/or decoder of the AE 240, such as BCM 212. Alternatively and/or optionally, the BECM 210 may send the code 250 to a module or controller directly, such as PCM 214 in this example. The PCM 214 includes another instance of the AE 240 and is used to reconstruct the original battery cell measurements. It should be noted that the reconstructed measurements are a close approximation to or estimate of the original measurement values but are not necessarily identical.

Various embodiments may also optionally provide data validation or verification of the reconstructed measurement values for some or all of the communications of code representation of the measurements generated by an AE 240. The validity verification may be used to detect anomalies in the original measurements and/or errors introduced in generating the encoded representation of the measurements, or during communication of the encoded representation. The code 250 is sent from a CMM 232 to the BECM 210 with an associated original cell voltage signal 270 that needs to be verified. Original cell voltage signal 270 may include one or more discrete measurements or values, or a continuous voltage signal. Prior to using the reconstructed signal or values 262 for any control decision, the BECM 210 compares the value(s) in the original signal with the associated or corresponding value(s) in the reconstructed signal that represents the same battery cell. If the difference is below a threshold (e.g., 0.1V), the value is considered as valid. Otherwise, the value should be considered as invalid and ignored. A corresponding diagnostic code may then be generated and stored and/or communicated to one or more controllers. Alternatively, the validity verification may occur in a different module that receives the code representation, such as the charger module 216, for example. In this case, the BECM 210 sends the code 250 to the charger module 216 periodically. Upon a request from the charger module 216, the BECM 210 gateways an original signal 270 to the charger module 216. The charger module 216 then verifies the validity of the original signal prior to using it in decision making. With the encoder and decoder of an instance of AE 240, the charger module 216 then reconstructs the cell voltages for all the cells represented in the code. Following that, the charger module selects the corresponding cell voltage signal from the reconstructed signals and compares it with the original signal to determine if the original signal is valid. As such, this strategy not only conserves resources with higher security, but also validates or verifies vehicle sensor measurements to prevent use of anomalous data.

Figure 3:
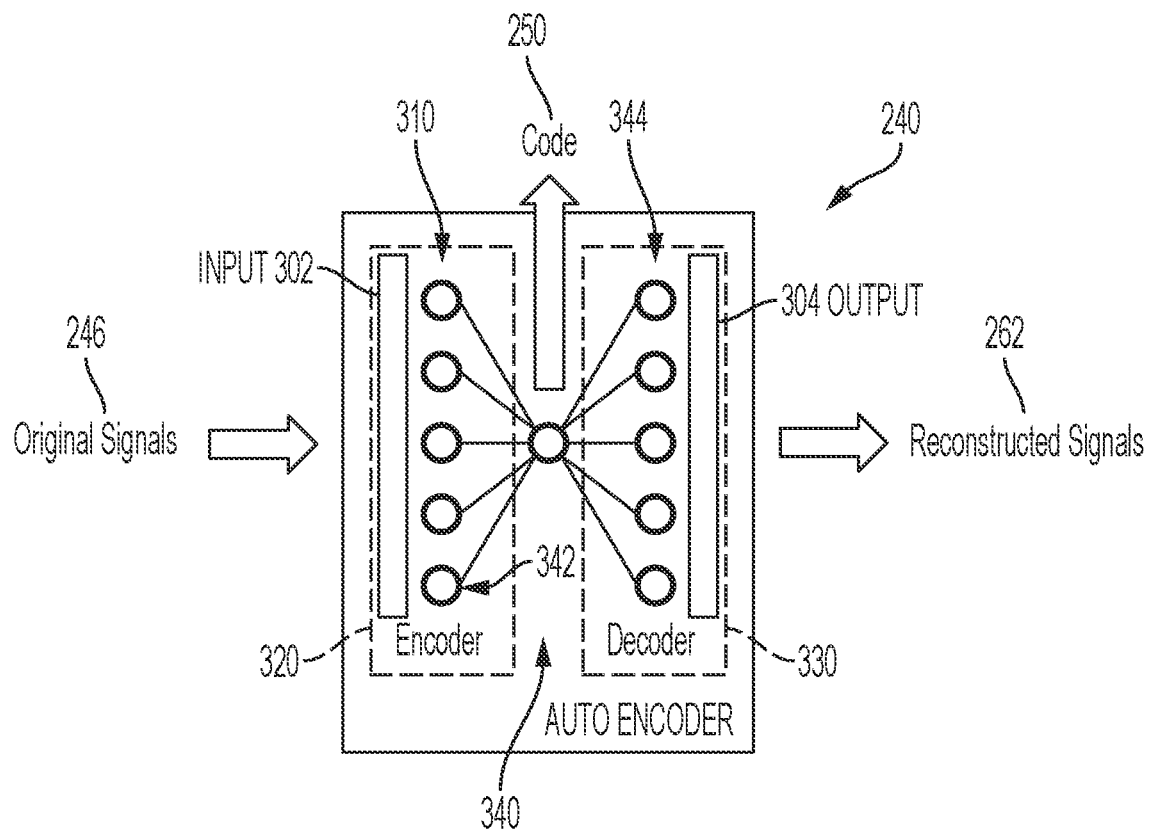
FIG. 3 is a block diagram illustrating a representative artificial intelligence device or strategy implemented as a symmetric artificial neural network to encode and decode vehicle signals communicated between vehicle modules, between vehicles, or to a data center.

A representative embodiment of an autoencoder neural network (AE) 240 that includes an encoder and decoder is illustrated in FIG. 3. In this embodiment, AE 240 includes an input layer 302, an output layer 304, and an odd number of hidden layers 310 to provide a symmetric structure with the encoder 320 and decoder 330 having the same number of layers (a single layer in this example, but additional layers may be provided depending on the particular application and implementation). When the original measurements or signals 246 from the input layer 302 pass through the encoder 320 to a bottleneck layer 340 (the single middle layer), the bottleneck layer 340 generates the code 250 which represents the compressed and encrypted data. The encoder 320 maps the input into the code 250 while decoder 330 maps the code 250 to the reconstructed signals 262. Code 250 may also be referred to as latent variables or latent representation depending on the implementation. In the representative embodiment illustrated, three hidden layers 310 are provided. The first and last hidden layers each include 20 neurons or nodes (only five of which are illustrated). The middle layer or bottleneck layer 340 includes only a single neuron or node. The input layer 302 and the first hidden layer 342 are combined as the encoder 320. The output layer 304 and the last hidden layer 344 are combined as the decoder 330. The encoder 320 converts or maps the data in the original signals 246 into the code 250, which is the encoded representation of the data. In the representative application described herein, the code 250 has the same number of data points as each of the ten original signals, but the code 250 contains all the information from the ten original signals. As such, AE 240 provides a compression rate or ratio of 10:1. Stated differently, if the cell voltage signals from twenty cells each contain fifty measurements for a total of one-thousand data points, the generated code 250 will include an encoded representation of the one-thousand data points within one-hundred values. The compression rate can be changed from 10-to-1 to any higher rate if more signals are compressed. The decoder 330 then generates reconstructed signals 262 having one-thousand measurement values that are a close approximation of the original signals 246.

Figure 4:
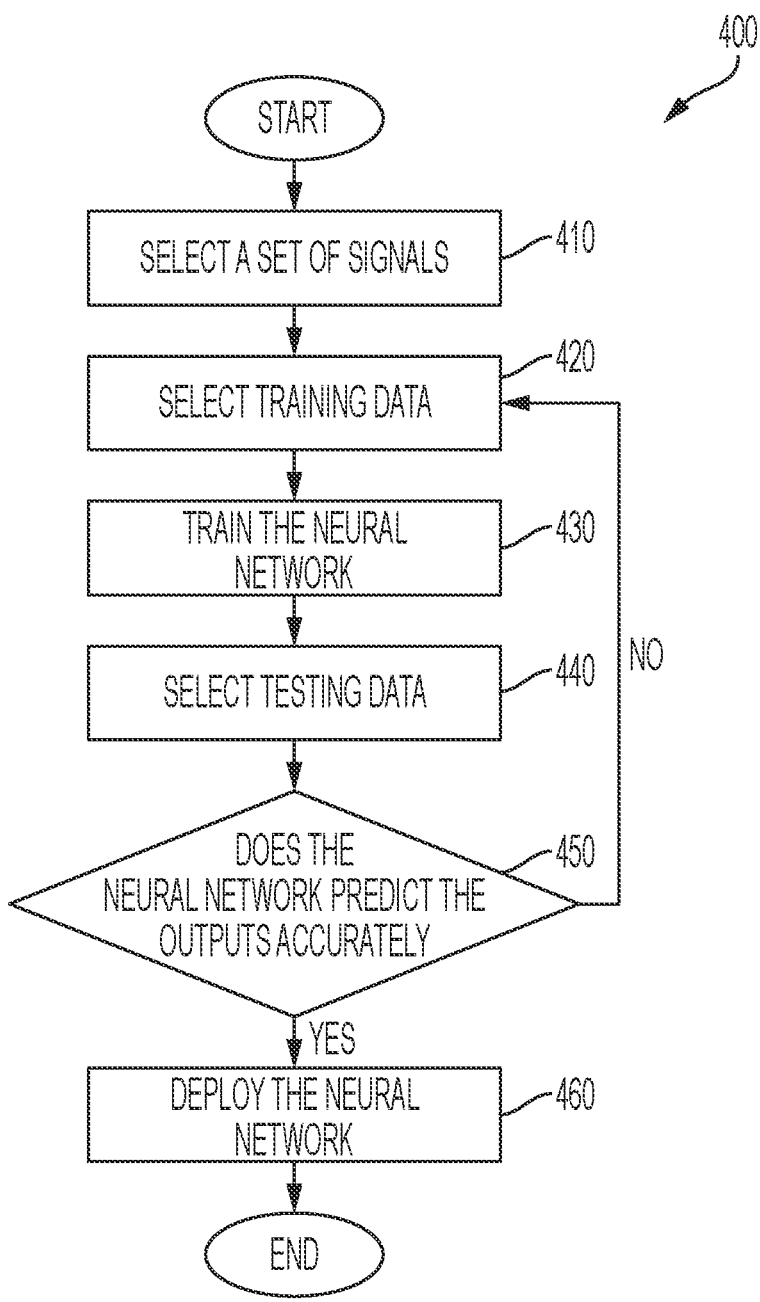
FIG. 4 illustrates operation of a system or process to train an artificial neural network used in communicating vehicle sensor data.

FIG. 4 illustrates a representative process or method 400 used to generate a trained neural network or autoencoder prior to deployment in one or more vehicle controllers. The trained neural network is used to encode and decode data for secure, reduced bandwidth communication and storage within the vehicle or to an external network or server as previously described. The process 400 begins with selecting a set of vehicle signals or measurements at 410. After selecting the set of signals to be encoded by the neural network at 410, training data is selected at 420 to begin training the neural network as indicated at 430. Testing data is selected to evaluate the performance of the trained neural network as indicated at 440. The testing data is used to verify and validate the performance of the neural network. The training data and validation data should be separate data. In one embodiment RMSE is used to train the neural network with the training data and to evaluate the performance of the neural network with the testing data. If the RMSE is less than an associated threshold at 450, such as 0.1 for battery cell voltages of every signal in the bundle, the neural network meets the design target and is deployed to one or more controllers as represented at 460. Otherwise, if the RMSE (or other reconstruction loss or error evaluation parameter) exceeds the associated threshold at 450, the neural network training continues, with possible adjustments to the training data at 420.

Figure 5:
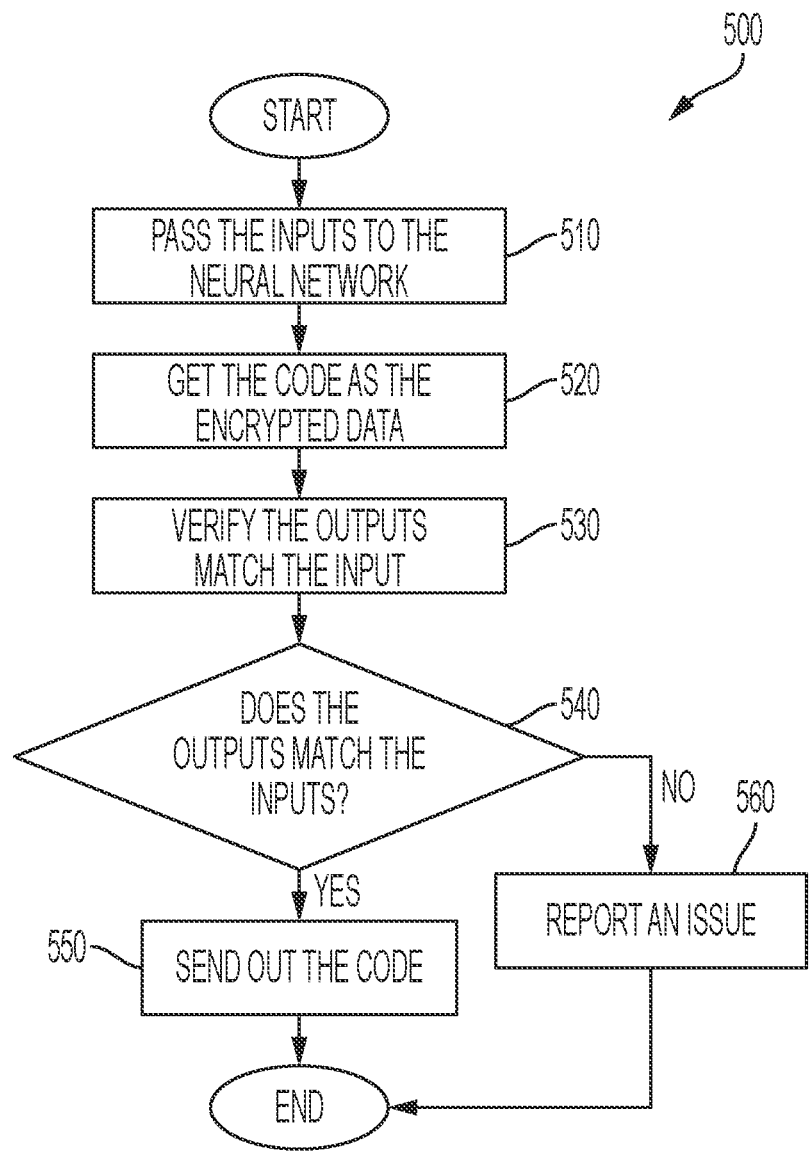
FIG. 5 illustrates operation of a system or process to generate encoded vehicle data using an artificial neural network prior to communication.

FIG. 5 illustrates an algorithm 500 for evaluating the encoder and decoder performance before the generated code is broadcast. To verify the performance for any specific time-series input, a set of inputs such as cell voltages is passed through the encoder of the previously-trained neural network at 510 to generate the code (encoded data) at 520. The code is then passed to the decoder to generate the reconstructed signal at the output to verify the outputs match the inputs as represented at 530. The outputs are then compared to the inputs to determine if the code can be used as represented at 540, i.e. if the difference between the inputs and the outputs is less than an associated threshold (for example an RMSE<0.1). If the outputs match the inputs, then the code is sent out as represented at 550. Otherwise, an issue is reported as represented at 560, which may be used to determine the root cause of the issue and may be addressed by retraining the neural network.

After the verified code has been generated, broadcast, and received by one or more controllers having instances of the trained neural network, the decoding process is performed as previously described with respect to FIG. 2, and may include validation or verification of data. Validation or verification of data may be performed periodically, in response to a specific request, or for every communication, for example, and may also depend on the particular controller within a vehicle, or a particular vehicle application or implementation.

To demonstrate operation and assess performance of a representative embodiment of an autoencoder neural network according to the disclosure, ten (10) traction battery cell voltage signals were selected. Training data were selected to train the autoencoder, and different validation data were selected to assess the operation of the trained neural network. Each of the original and corresponding reconstructed signals were plotted and compared on the same subplots to verify that the measurements of the reconstructed signals closely approximated or estimated the measurements of the original signals.

Figure 6:
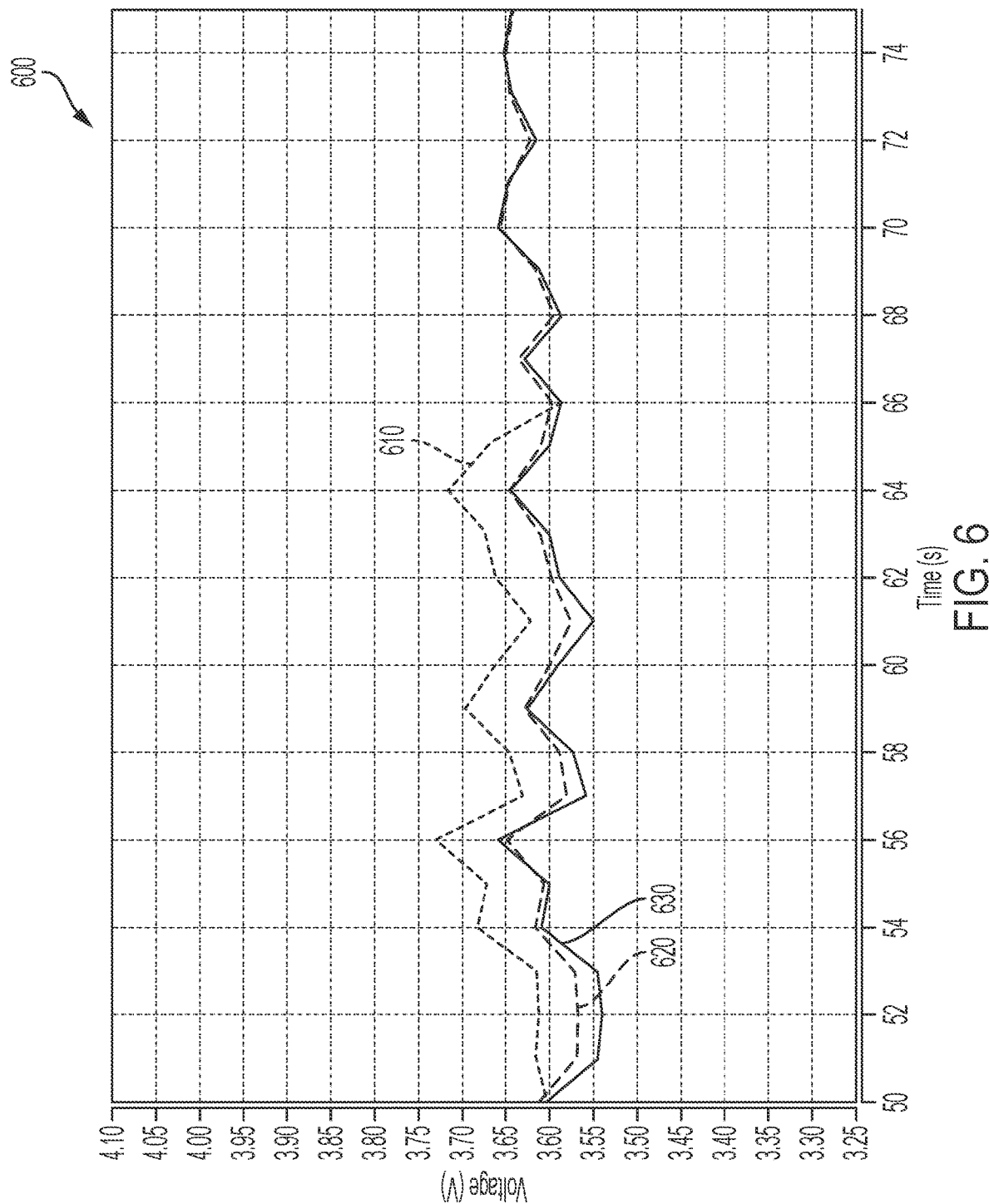
FIG. 6 is a graph illustrating improvement in anomaly detection capability for battery cell voltage data encoded/decoded using an autoencoder for communication of battery cell voltage data.

As previously described, in addition to secure data transfer, the encoded representation of the vehicle measurements generated by the same neural network can be used to verify signal validity. FIG. 6 is a graph 600 of voltage as a function of time for battery cell voltage signals encoded and decoded by a neural network as described herein illustrating cell voltage anomaly detection. Data represented by line 610 represents an anomalous voltage signal beginning around 50 s and extending through 66 s. Data represented by line 620 represents a reconstructed cell voltage signal generated from an encoded representation of the original signal by a neural network. Data represented by line 630 represents data of the original signal without anomalies. As previously described, the reconstructed cell voltage signal 620 is a prediction or close approximation to the expected cell voltage signal. Line 610 represents an anomalous voltage signal that may result from actual anomalous operation of a battery cell or group of cells, from corrupted communication, or from intentional hacking. If the predicted/reconstructed voltage signal 620 differs from the voltage signal 610 reconstructed from the code by more than a threshold used in training the neural network, such as 0.1V, the received voltage signal is considered invalid until the difference falls below the threshold and may generate a diagnostic code and prevent use of the anomalous signal measurements.

As previously described, existing strategies for vehicle measurement data handling, particularly for traction battery cell voltages, neither compress the cell voltages to save controller and communication resources nor encrypt cell voltages to prevent unauthorized usage. Likewise, existing strategies do not allow data to be decompressed and decoded for authorized usage and may only transmit and store statistical properties of data, such as maximum, minimum, or average values, for example. However, identification of particular cells or groups of cells having the maximum and minimum voltages are ignored making diagnostics more difficult than the strategy of the present disclosure. When the existing strategies transmit and store all the cell voltages, either the sampling rate/cycle time is sacrificed or a large amount of resources is used inefficiently. Furthermore, existing strategies have limited capability to verify the validity of the values in cell voltage signals which may result in invalid values used in the vehicle operation, data analysis, and/or business decisions. Simply looking at a voltage deviation from average cell voltage is insufficient for many applications.

In contrast, one or more embodiments of the disclosure as described above utilize artificial intelligence to achieve encoding, decoding, compression, and decompression of data within one single apparatus. Use of a neural network to encrypt, compress, decode, and decompress data may has been used to downsize a dataset of battery cell voltages to 1/10 of its original size. The 10-to-1 compression rate can be further increased if the dataset has more signals. The maximum root-mean-square error (RMSE) among ten RMSEs in one demonstrated example was 0.01V. The associated trained neural network was capable of detecting a voltage anomaly as small as 0.07V under load.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery;
   a cell monitor associated with each of a plurality of battery cell strings of the traction battery, each battery cell string having an associated plurality of connected battery cells, each cell monitor including a processor and memory and configured to receive battery cell voltage measurements and to generate, using a neural network, a compressed encoded representation of the traction battery cell voltage measurements;
   a battery controller having a processor and memory and in communication with each cell monitor, the battery controller configured to receive the compressed encoded representation of the battery cell voltage measurements, to generate, using a second instance of the neural network, reconstructed traction battery cell voltage measurements, and to control the traction battery in response to the reconstructed traction battery cell voltage measurements; and
   a charging controller having a processor and memory, the charging controller in communication with the battery controller, the charging controller configured to:
   receive the compressed encoded representation of the battery cell voltage measurements;
   receive an unencoded battery cell voltage measurement associated with the compressed encoded representation of the battery cell voltage measurements;
   generate, using a third instance of the neural network, reconstructed battery cell voltage measurements;
   control charging of the traction battery when a difference between the unencoded battery cell voltage measurement and a corresponding battery cell voltage measurement from the reconstructed battery cell voltage measurements is not greater than an associated threshold; and
   generate a diagnostic code when the difference exceeds the associated threshold.

2. The vehicle of claim 1 wherein at least one cell monitor is configured to communicate an unencoded battery cell voltage measurement with the compressed encoded representation of the battery cell voltage measurements.

3. The vehicle of claim 2 wherein the battery controller is further configured to compare the unencoded battery cell voltage measurement with a corresponding one of the reconstructed battery cell voltage measurements.

4. The vehicle of claim 3 wherein the battery controller is further configured to generate a diagnostic code in response to a difference between the unencoded battery cell voltage measurement value and the corresponding one of the reconstructed battery voltage measurement values exceeding an associated threshold.

5. The vehicle of claim 1 wherein the battery controller is configured to communicate the reconstructed battery cell voltage measurements to at least one vehicle controller.

6. The vehicle of claim 1 further comprising:
   an electric machine powered by the traction battery and configured to provide propulsive power to the vehicle; and
   a powertrain controller having a processor and memory and in communication with the battery controller and the electric machine, the powertrain controller configured to receive the compressed encoded representation of the battery cell voltage measurements from the battery controller, to generate, using a fourth instance of the neural network, the reconstructed battery cell voltage measurements, and to control the electric machine based on the reconstructed battery cell voltage measurements.

7. The vehicle of claim 1 wherein the neural network comprises a symmetric neural network having an odd number of hidden layers between an input layer and an output layer.

8. The vehicle of claim 7 wherein the neural network comprises a bottleneck layer having a single neuron and containing the compressed encoded representation of the battery cell voltage measurements.

9. The vehicle of claim 8 wherein the neural network comprises three hidden layers including a first hidden layer of twenty neurons coupled to the bottleneck layer, which is coupled to a second hidden layer of twenty neurons.

* * * * *